(12) United States Patent
Fleureau et al.

(10) Patent No.: US 11,798,195 B2
(45) Date of Patent: Oct. 24, 2023

(54) METHOD AND APPARATUS FOR ENCODING AND DECODING THREE-DIMENSIONAL SCENES IN AND FROM A DATA STREAM

(71) Applicant: InterDigital Madison Patent Holdings, SAS, Paris (FR)

(72) Inventors: Julien Fleureau, Cesson-Sevigne (FR); Bertrand Chupeau, Cesson-Sevigne (FR); Renaud Dore, Cesson-Sevigne (FR); Mary-Luc Champel, Marpire (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 501 days.

(21) Appl. No.: 16/962,405

(22) PCT Filed: Jan. 14, 2019

(86) PCT No.: PCT/EP2019/050832
§ 371 (c)(1),
(2) Date: Jul. 15, 2020

(87) PCT Pub. No.: WO2019/141631
PCT Pub. Date: Jul. 25, 2019

(65) Prior Publication Data
US 2021/0074025 A1    Mar. 11, 2021

(30) Foreign Application Priority Data

Jan. 19, 2018 (EP) .................................. 18305049

(51) Int. Cl.
*G06T 9/00* (2006.01)
*G06T 7/50* (2017.01)
(Continued)

(52) U.S. Cl.
CPC ............... *G06T 9/00* (2013.01); *G06T 7/50* (2017.01); *H04L 65/70* (2022.05); *H04L 65/75* (2022.05);
(Continued)

(58) Field of Classification Search
USPC ........ 382/232, 233; 375/240, 240.01, 240.25
See application file for complete search history.

(56) References Cited

U.S. PATENT DOCUMENTS 5,519,436 A    5/1996  Munson
11,202,086 B2*  12/2021  Schwarz ................. G06T 9/001
(Continued)

FOREIGN PATENT DOCUMENTS

EP    0634733 A2    1/1995
EP    2871845 A1    5/2015
(Continued)

OTHER PUBLICATIONS

Anonymous, "PixelTools—Repeat frame tech tip", XP055242996, Retrieved from the Internet: URL:http://www.pixeltools.com/tech_tip_repeat_frame.html [retrieved on Jan. 20, 2016], Jan. 1, 2009, 2 pages.
(Continued)

*Primary Examiner* — Ishrat I Sherali
(74) *Attorney, Agent, or Firm* — CONDO ROCCIA KOPTIW LLP (57) ABSTRACT

Methods and devices are provided to encode and decode a data stream carrying data representative of a three-dimensional scene, the data stream comprising color pictures packed in a color image; depth pictures packed in a depth image; and a set of patch data items comprising de-projection data; data for retrieving a color picture in the color image and geometry data. These data are inserted in the video track of the stream with associated temporal informa-
(Continued)

tion. The color and depth pictures that are repeated at least two times in a sequence of patches are not packed in the images but inserted in the image track of the stream and are pointed by color or geometry data.

12 Claims, 5 Drawing Sheets (51) Int. Cl.
  *H04L 65/70* (2022.01)
  *H04L 65/75* (2022.01)
(52) U.S. Cl.
  CPC ............... *G06T 2207/10021* (2013.01); *G06T 2207/10024* (2013.01); *G06T 2207/10028* (2013.01)

(56) References Cited

U.S. PATENT DOCUMENTS

| 11,375,235 | B2* | 6/2022 | Fleureau | H04N 13/161 |
| 11,386,524 | B2* | 7/2022 | Mammou | G06T 3/40 |
| 11,405,643 | B2* | 8/2022 | Schwarz | H04N 13/117 |
| 11,611,774 | B2* | 3/2023 | Yano | H04N 19/597 |
| 2011/0286530 | A1* | 11/2011 | Tian | H04N 21/2365 |
| | | | | 375/E7.026 |
| 2015/0085939 | A1 | 3/2015 | Deshpande | |
| 2017/0094262 | A1* | 3/2017 | Peterson | G06T 15/205 |
| 2017/0163980 | A1* | 6/2017 | Hirabayashi | H04N 21/438 |
| 2019/0139266 | A1* | 5/2019 | Budagavi | G06T 9/001 |
| 2022/0254068 | A1* | 8/2022 | Fleureau | G06T 15/20 |

FOREIGN PATENT DOCUMENTS

| EP | 3249921 A1 | 11/2017 |
| EP | 3249922 A1 | 11/2017 |
| JP | 2000125297 A | 4/2000 |

OTHER PUBLICATIONS

Swadzba et al., "Tracking Objects in 6D for Reconstructing Static Scenes", IEEE Conference on Computer Vision and Pattern Recognition Workshops (CVPR Workshops), Anchorage, Alaska, USA, Jun. 23, 2008, 7 pages.

* cited by examiner

METHOD AND APPARATUS FOR ENCODING AND DECODING THREE-DIMENSIONAL SCENES IN AND FROM A DATA STREAM

CROSS REFERENCE TO RELATED APPLICATIONS

This application is the national stage entry under 35 U.S.C. § 371 of International Application PCT/EP2019/050832, filed Jan. 14, 2019, which was published in accordance with PCT Article 21(2) on Jul. 25, 2019, in English, and which claims the benefit of European Patent Application No. 18305049.1, filed Jan. 19, 2018.

1. TECHNICAL FIELD

The present principles generally relate to coding and decoding of a three-dimensional (3D) scene or a sequence of three-dimensional scenes in and from a data stream. Particularly, but not exclusively, the technical field of the present principles is related to encoding/decoding of color images for the textures and depth images or analytic parameters for the geometry of the scenes.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and also prevent from dizziness by providing consistent visual feedback during head translations. The content is created by the means of dedicated sensors allowing the simultaneous recording of color and depth of the scene of interest. The use of rig of color cameras combined with photogrammetry techniques is a common way to perform such a recording.

A volumetric video is a sequence of 3D scenes. A solution to encode volumetric videos is to project each 3D scene of the sequence of 3D scene onto projection maps which are clustered in color pictures and depth pictures, called patches. Patches are packed in color and depth images which are stored in the video track of a video stream. This encoding has the advantage to make use of standard image and video processing standards. At the decoding, pixels of the color pictures are de-projected at a depth determined by information stored in the associated depth picture. Such solutions are effective. However, encoding this huge amount of data as images in the video track of a video stream raises problems. The size of the bit stream induces bitrate technical issues regarding storage space, transmission over a network and decoding performances.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method of encoding a point cloud in a stream. The present disclosure relates to a method for encoding a three-dimensional scene in a data stream comprising a video track and an image track. The method comprises:
   obtaining a set of patches, a patch belonging to a sequence of patches, a patch comprising de-projection data, a color picture and a depth picture;
   for a sequence of patches, determining for each color picture and depth picture whether the picture is a static picture or a non-static picture, a picture being static if the picture is repeated at least two times in the sequence;
   for a set of patches:
      generating a color image packing non-static color pictures of the set of patches; a depth image packing non-static depth pictures of the set of patches; and a set of patch data items, a patch data item comprising, for a patch, the de-projection data and
      if the color picture is non-static, a location of the color picture in the color image; else a pointer to a static picture in the image track of the stream; and
      if the depth picture is non-static, a location of the depth picture in the depth image; else a pointer to a static picture in the image track of the stream;
      encoding said color image, depth image and set of patch data items at a position in the video track of the stream;
   encoding static color and depth pictures in the image track of the stream at a position prior to the position of a first pointer to said static color or depth picture encoded in the video track of the stream.

The present disclosure also relates to a device adapted to encode a three-dimensional scene in a stream. The device comprises a memory associated with a processor configured to execute the present method of encoding a three-dimensional scene in a stream.

The present disclosure also relates to a method of decoding a three-dimensional scene from a data stream comprising a video track and an image track. The method comprises:
   obtaining a picture at a first position in the image track of said data stream, pixels of said picture comprising depth and/or color component;
   obtaining at a second position in the video track of said data stream:
      a color image comprising color pictures packed in said colored image;

a depth image comprising depth pictures packed in said depth image; and a set of patch data items, a patch data item comprising:
de-projection data;

a color data comprising a location of a color picture in the color image or a pointer to said first picture; and a geometry data a location of a depth picture in the depth image or a pointer to said first picture;

wherein said first position is prior to said second position in the stream; and for a patch data item of said set, using de-projection data for de-projecting pixels of the color picture described in said patch at a depth determined according to pixels of the depth picture described in said patch The present disclosure also relates to a device adapted to decode a three-dimensional scene from a data stream. The device comprises a memory associated with a processor configured to execute the present method of decoding a three-dimensional scene from a data stream.

The present disclosure also relates to a data stream carrying data representative of a three-dimensional scene. The data stream comprises:

an image track comprising at least a picture at a first position in said data stream, pixels of said picture comprising depth and/or component;

a video track comprising at least a data triplet at a second position in the data stream, the data triplet comprising:

a color image comprising color pictures packed in said color image;

a depth image comprising depth pictures packed in said depth image; and a set of patch data items, a patch data item comprising:
de-projection data;

a color data comprising a location of a color picture in the color image or a pointer to said first picture; and a geometry data a location of a depth picture in the depth image or a pointer to said first picture;

wherein said first position is prior to said second position in the stream;

4. BRIEF DESCRIPTION OF DRAWINGS

The present disclosure will be better understood, and other specific features and advantages will emerge upon reading the following description, the description making reference to the annexed drawings wherein.

5. DETAILED DESCRIPTION OF EMBODIMENTS

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

The present principles are described for encoding/decoding a three-dimensional (3D) scene or a sequence of three-dimensional scenes in and from a data stream.

Figure 1:
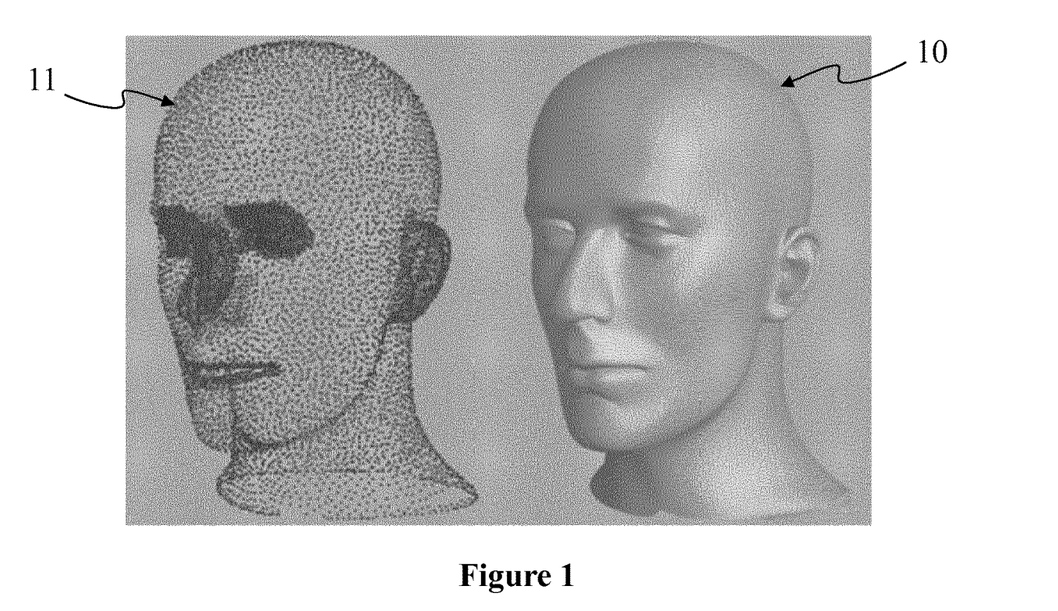
FIG. 1 shows a three-dimension (3D) model of an object and a points of a point cloud corresponding to the 3D model, according to a non-restrictive embodiment of the present principles.

FIG. 1 shows a three-dimension (3D) model of an object 10 and a points of a point cloud 11 corresponding to 3D model 10. Model 10 may be a 3D mesh representation and points of point cloud 11 may be the vertices of the mesh. Points 11 may also be points spread on the surface of the faces of the mesh. Model 10 may also be represented as a splatted version of point of cloud 11; that is the surface of model 10 is created by splatting the point of point of cloud 11. Model 10 may also be represented by many different representations such as voxels or splines. FIG. 1 illustrates that it is always possible to define a point cloud from a surface representation of a 3D object. Reciprocally it is always possible to create a surface representation of a 3D object from a point of cloud. As used herein, projecting points of a 3D object (by extension points of a 3D scene) to an image is equivalent to projecting any representation of this 3D object onto an image.

Figure 2:
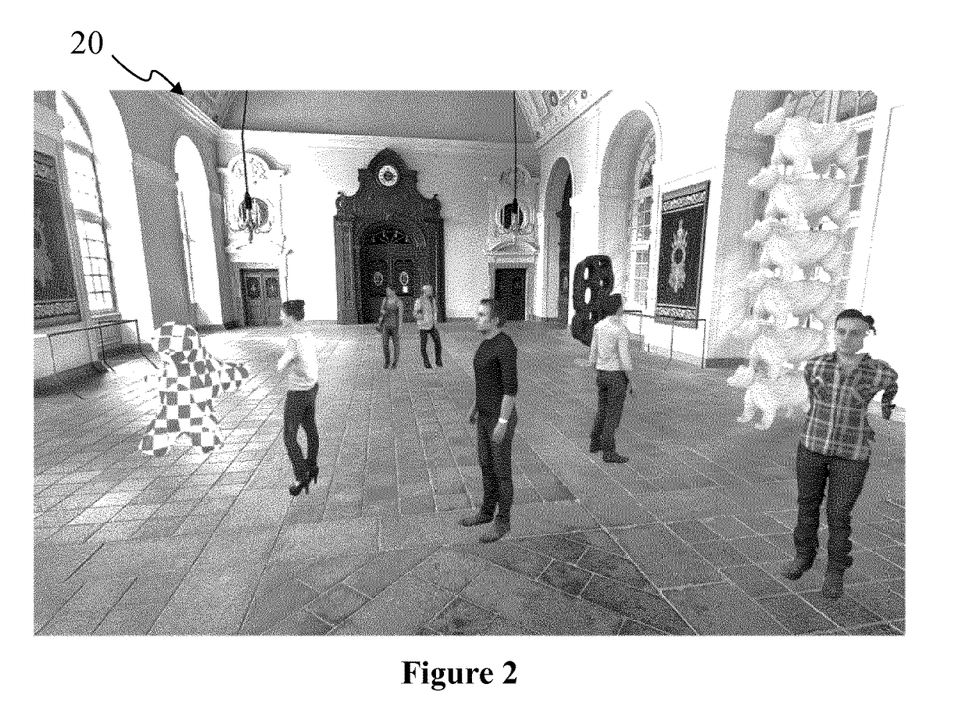
FIG. 2 shows an image representing a three-dimension scene comprising a surface representation of several objects captured as a point cloud, according to a non-restrictive embodiment of the present principles.

FIG. 2 shows an image 20 representing a three-dimensional scene comprising a surface representation of several objects captured as a point cloud. The image 20 is generated from a point of view different of the acquisition point of view. For example, the character at the right of the image 20 is not complete, points of his left arm and his back are not available (e.g. they have not been captured) to fulfill the surface representation. The 3D scene may comprise different types of representation. For example, characters in the scene are represented as point clouds while statues are represented as textured meshes. A 3D scene is always rendered from a point of view. All points of the scene are not visible from the point of view, some parts of the scene are occulted by visible parts. A viewer of a volumetric video may move within the 3D scene in an area defining a set of possible points of view. Every point of the 3D scene visible from this set of possible points of view has to be encoded. A volumetric video data stream encodes a sequence of 3D scenes. Some parts of the 3D scene changing over the time (e.g. moving characters, changes in lighting conditions) and some part remain still (e.g. the geometry of structural objects like wall or floor). The present principles embody a solution to limit as much as possible multiple encoding of parts of the 3D scene that does not change over the time in order to limit the required bit rate and accelerate the decoding.

Figure 3:
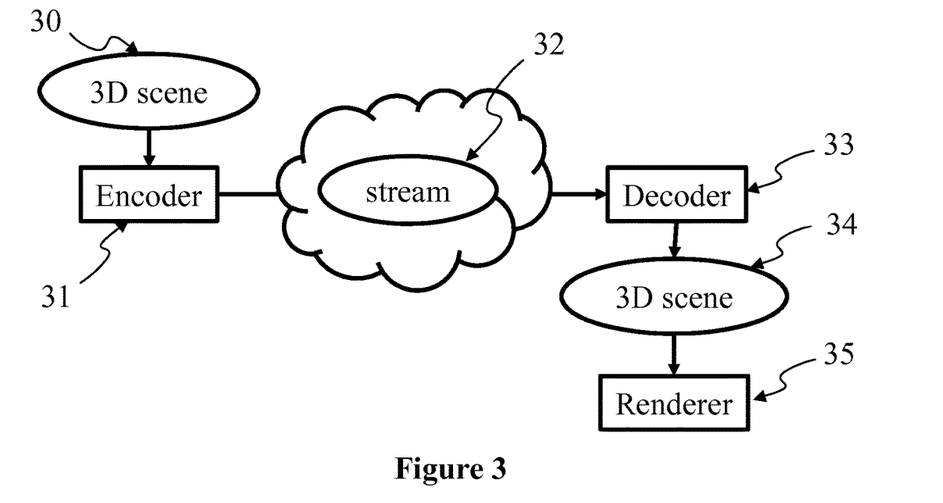
FIG. 3 illustrates an example of the encoding, transmission and decoding of a sequence of 3D scenes, according to a non-restrictive embodiment of the present principles.

FIG. 3 illustrates an example of the encoding, transmission and decoding of a sequence of 3D scenes. A sequence of at least 3D scene 30 is encoded in a stream 32 by an encoder 31 according to the principles of the present encoding method. A decoder 33 obtains stream 32 from a source. For example, the source belongs to a set comprising:
  a local memory, e.g. a video memory or a RAM (or Random Access Memory), a flash memory, a ROM (or Read Only Memory), a hard disk;
  a storage interface, e.g. an interface with a mass storage, a RAM, a flash memory, a ROM, an optical disc or a magnetic support;
  a communication interface, e.g. a wireline interface (for example a bus interface, a wide area network interface, a local area network interface) or a wireless interface (such as a IEEE 802.11 interface or a Bluetooth® interface); and
  a user interface such as a Graphical User Interface enabling a user to input data.

Decoder 33 decodes a sequence of 3D scenes 34 from stream 32 according to the present decoding method. According to the present principles, sequence of 3D scene 34 is as similar to sequence of 3D scenes 30 as possible. Sequence of 3D scenes 34 may be obtained from a source by a rendered 35. Renderer 35 computes images to be displayed for a 6DoF video viewing experience.

According to the present principles, pictures are obtained by projecting points of the 3D scene onto projection maps according to a projection mapping. Many projection mappings may be used to generate patches such as equirectangular mapping, cube mapping, pyramidal mapping or orthonormal mapping. A patch comprises:
  a color picture resulting of the projection of the textures onto a projection map,
  a depth picture storing the geometry information, i.e. the distance between points of the scene and the projection map; and
  de-projection data that are data allowing to retrieve the part of the scene encoded in the two pictures. De-projection data are used by the decoder to de-project the color pixels of the color picture in the 3D space at a depth determined by the pixel values of the depth picture.

Figure 4:
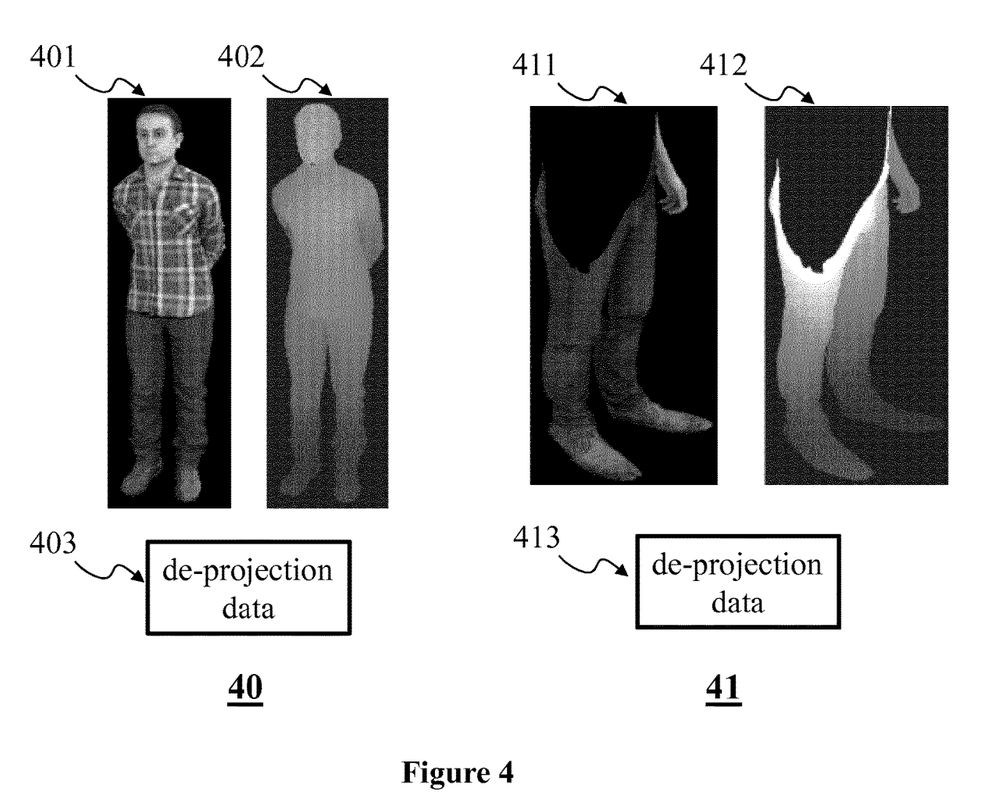
FIG. 4 illustrates two patches relative to the 3D scene of FIG. 2, each patch comprising a color picture, a depth picture and de-projection data, according to a non-restrictive embodiment of the present principles.

FIG. 4 illustrates two patches relative to the 3D scene of FIG. 2, each patch comprising a color picture, a depth picture and de-projection data. Different projection process may be used to generate patches. For example, the patches may be generated by a peeling projection process. Another possibility is to use octrees of cube mapping projections. Any suitable projection process may be used to generate a patch. A projection process suitable for the present principles generates a set of patches, patches comprising a color picture, a depth picture (or a unique picture storing both pixel data) and de-projection data to allow the decoder to decode the three-dimensional scene from the two pictures. In the example of an equirectangular projection mapping, de-projection data may comprise coordinates of the center of projection, the solid angle in the frame of reference that the patch correspond to (e.g. [θmin,θmax], [φmin,φmax]) and a range of depth value used for encoding the depth in the depth picture. Every data needed for de-projecting the information stored in the two pictures by the projection process is comprised in the de-projection data. These data allow the decoder to retrieve the 3D coordinates and the color of points projected in the two projection maps. On the example of FIG. 4, a patch 40 is generated comprising a color picture 401, a depth picture 402 and a set of de-projection data 403. This patch encodes data representative of the front side of one of the characters of the 3D scene of FIG. 2. Color picture 401 is the result of the projections of points of this part of the scene on a plane localized in the 3D space of the scene. Pixels of depth picture 402 stores the distances of between this plane and this part of the 3D scene. On the example of FIG. 4, the brighter the depth pixel, the closer to the plane the point of the scene. A black depth pixel means there is no color information at these coordinates in the color picture. A second example of patch 41 is provided on FIG. 4. Patch 41 corresponds to a part of a second character of the 3D scene of FIG. 2. Patch 41 comprises a color picture 411, a depth picture 412 and de-projection data 413. De-projection data 413 are different from de-projection data 403. In the example of an equirectangular projection mapping, the center of projection may be different, the solid angle of the 3D space encoded in these two pictures is different and the dynamics of the depth encoding in the depth picture may also be different. Patches may have different sizes and different shapes. On the examples of the present document, every patch is rectangular. This is only an example and, according to the projection process, patches may have any shape (e.g. an ellipse or a trapezoid). If not set by default, this information is comprised in the de-projection data.

According to the present principles, a set of patches representative of the 3D scene to encode are obtained according to any suitable method. These patches are then packed into color and depth images in order to be added to the video track of a data stream, for example according to the ISO BMFF standard. The cumulative size of color and depth pictures of patches for a 3D scene may be substantial.

Figure 5:
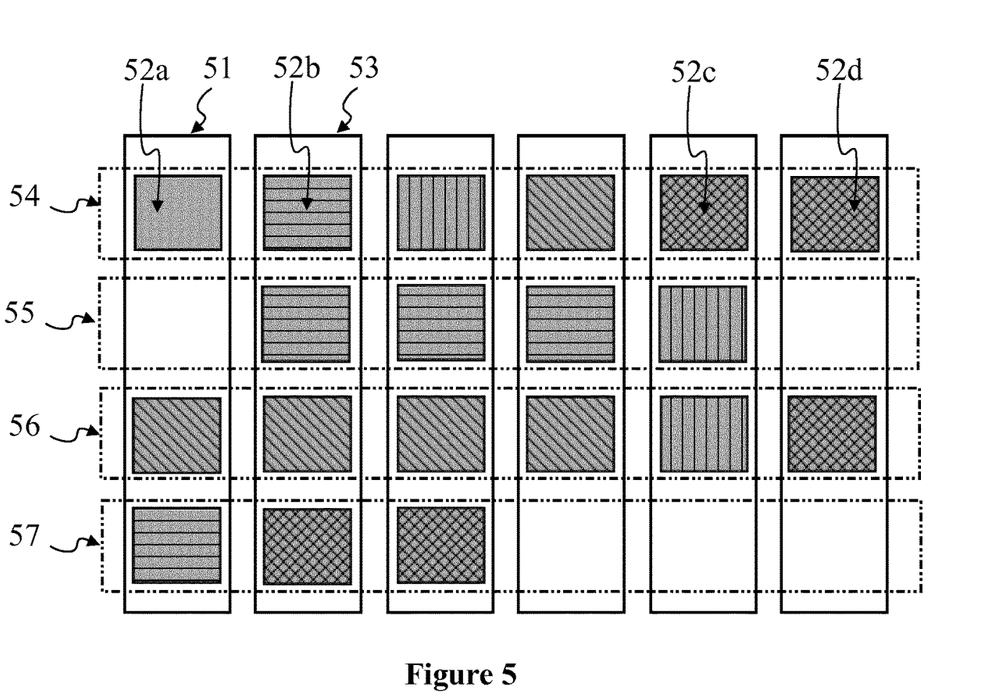
FIG. 5 illustrates a crossed structure of the patches generated by the projection process, according to a non-restrictive embodiment of the present principles.

FIG. 5 illustrates a crossed structure of the patches generated by the projection process. For a given 3D scene, a set of patches 51 or 53 is generated. Numbers of patches in sets of patches may vary over the sequence of 3D scenes. A patch 52a, 52b, 52c or 52d is defined according to its de-projection data. A patch 52b of a set of patches 53 belongs to the same sequence of patches 54 than patch 52a of a previous set of patches 51 if it has the same values of de-projection data. In other words, two patches 52a and 52b are equivalent when they are the result of a same projection, that is when points of the 3D scene have been projected under the same conditions. In the example of FIG. 5, six sets of patches are represented, forming four sequences of patches 54 to 57.

Patches of a sequence of patches are compared to determine whether the color or depth picture of the patch is static or non-static. A picture is set static if the picture is repeated at least two times in the sequence. Any method for determining if a picture is repeated in a set of pictures is suitable for the present test. For example, if the Euclidian distance between two depth pictures is lower than a threshold, the two depth pictures are considered equivalent and are both set to the static status. On the example of FIG. 5, patch sequence 54 comprises a patch 52c with a depth picture equivalent to depth picture of patch 52d. Patch sequence 55 comprises three equivalent depth pictures; patch sequence 56, four equivalent depth pictures and patch sequence 57, two equivalent depth pictures. On this example of FIG. 5, only depth pictures are considered for the sake of simplicity and because equivalence is much more frequent between depth pictures (i.e. the geometry of the projected part of the scene) than between color pictures which are more changing because of lighting condition variations.

Figure 6:
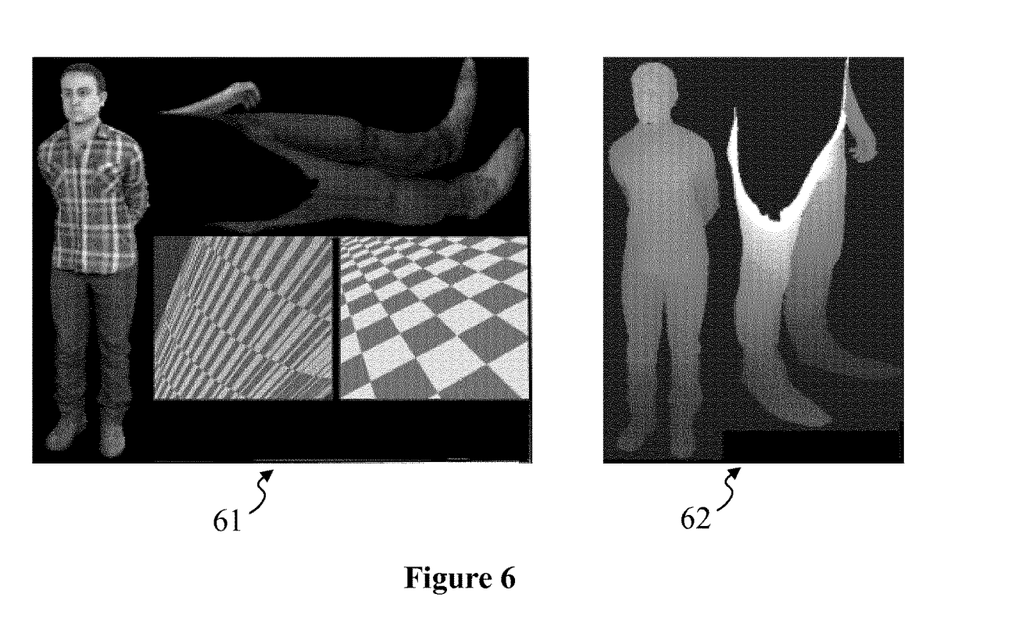
FIG. 6 illustrates packing of the obtained patches in color and depth images, according to a non-restrictive embodiment of the present principles.

FIG. 6 illustrates packing of the obtained patches in color and depth images. A packing operation is performed on every non-static color picture obtained for a 3D scene to generate a color image 61 and on every non-static depth picture to generate a color image 62. Numerous heuristic algorithms exist to solve the NP-complete problem of packing rectangular cells into a rectangular bin (i.e. the image to be generated), as the algorithm described in "A Thousand Ways to Pack the Bin" by Jukka Jylänki for instance or the "MaxRects" algorithm (i.e. Single Bin—Best Short Side First configuration) which provides good filling ratio at quite low computational costs. At the end of the packing operation, a location (x, y) (e.g. lower left corner position), a shape (e.g. rectangle, ellipse) and a size of the color picture in the image, and, according to the packing algorithm, a boolean value indicating whether the patch has been rotated are assigned to each patch of the patch data item list. The packing may be optimized by aligning the color pictures on Coding Units of the video encoder in order to improve the decoding stage. FIG. 6 shows a picture in which are packed color and depth pictures of FIGS. 4 and 5. Static color and depth pictures are not packed in the color image and depth image. This has the advantage to generate smaller color and depth images. Indeed static pictures are repeated over the time and may be encoded only once instead of being repeated for each set of patches in which they appear.

Figure 7:
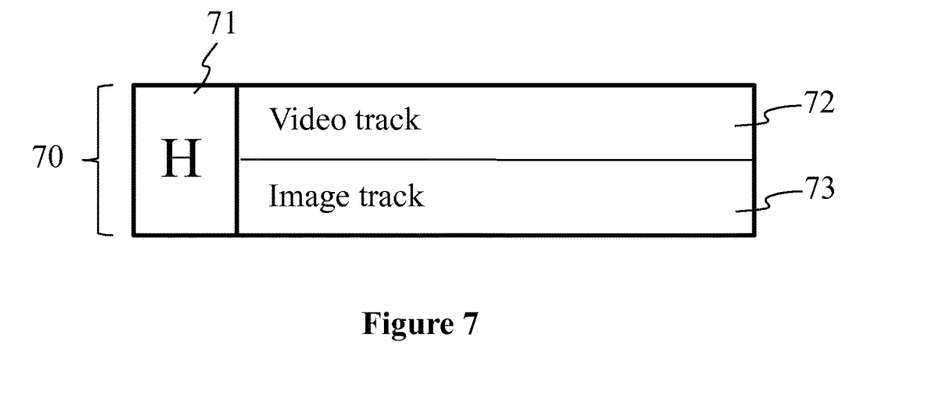
FIG. 7 shows an example of an embodiment of the syntax of a stream when the data are transmitted over a packet-based transmission protocol, according to a non-restrictive embodiment of the present principles.

FIG. 7 shows an example of an embodiment of the syntax of a stream when the data are transmitted over a packet-based transmission protocol. FIG. 7 shows an example structure 70 of a volumetric video stream. The structure consists in a container which organizes the stream in independent elements of syntax. The structure may comprise a header part 71 which is a set of data common to every syntax elements of the stream. For example, the header part comprises metadata about syntax elements, describing the nature and the role of each of them. The header part may also comprise information about the size and the resolution of images and pictures. The structure comprises a payload comprising at least a video track 72 and an image track 73.

The video track comprises video frames of the sequence of 3D scenes (i.e. the sequence of generated packed color images and depth images associated with their patch data items). The video track is structured to store temporal data of the video. A triplet of color image, depth image and set of patch data items is inserted in the video track of the data stream at a position relative to the time stamp of the related 3D scene in the sequence of 3D scenes. When a color data in a patch data item points to a static picture stored in the image track of the data stream, this picture is inserted at a prior position of the data stream. In other words, at the decoding, the picture is received before the patch data item pointing to it.

The image track carries image and picture data without temporal feature. Every static color and depth pictures are inserted in the image track of the data stream at a position that is prior to the position of the first data item pointing to this picture. In this way, at the decoding, the picture is received before the patch data item pointing to it.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

Figure 8:
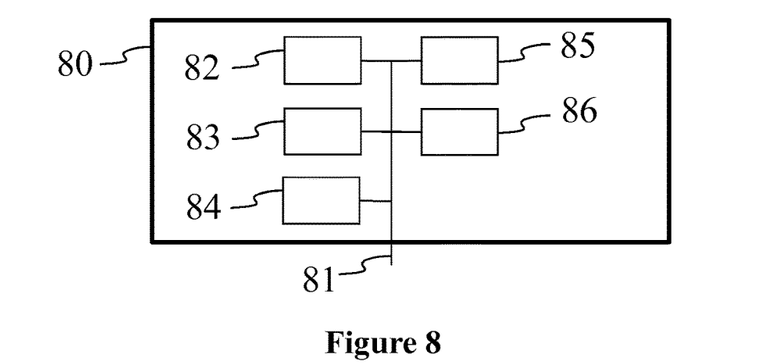
Figure 9:
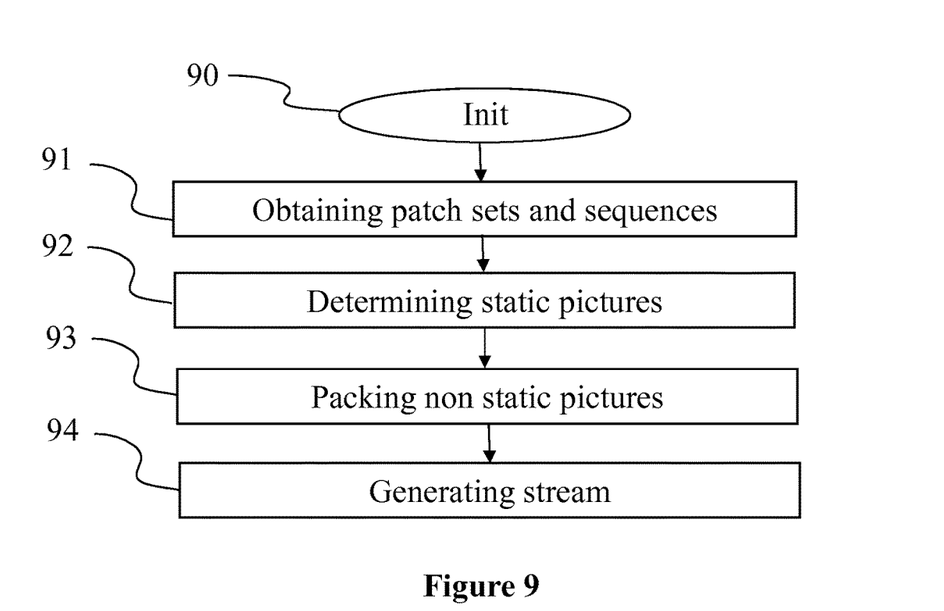
FIG. 9 illustrates a method for encoding a point cloud in a stream, in a device of FIG. 8 configured to be an encoder 31 of FIG. 3, according to a non-restrictive embodiment of the present principles.

FIG. 8 shows an example architecture of a device 80 which may be configured to implement a method described in relation with FIGS. 9 and/or 10. The device 80 may be configured to be an encoder 31 or a decoder 33 of FIG. 3.

The device 80 comprises following elements that are linked together by a data and address bus 81:
- a microprocessor 82 (or CPU), which is, for example, a DSP (or Digital Signal Processor);
- a ROM (or Read Only Memory) 83;
- a RAM (or Random Access Memory) 84;
- a storage interface 85;
- an I/O interface 86 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 83 comprises at least a program and parameters. The ROM 83 may store algorithms and instructions to perform techniques in accordance with present principles. When switched on, the CPU 82 uploads the program in the RAM and executes the corresponding instructions.

The RAM 84 comprises, in a register, the program executed by the CPU 82 and uploaded after switch-on of the device 80, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 31 of FIG. 3, the three-dimensional scene 30 is obtained from a source. For example, the source belongs to a set comprising:
- a local memory (83 or 84), e.g. a video memory or a RAM (or Random Access Memory), a flash memory, a ROM (or Read Only Memory), a hard disk;
- a storage interface (85), e.g. an interface with a mass storage, a RAM, a flash memory, a ROM, an optical disc or a magnetic support;
- a communication interface (86), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 33 of FIG. 3, the stream is sent to a destination; specifically, the destination belongs to a set comprising:
- a local memory (83 or 84), e.g. a video memory or a RAM, a flash memory, a hard disk;
- a storage interface (85), e.g. an interface with a mass storage, a RAM, a flash memory, a ROM, an optical disc or a magnetic support; and
- a communication interface (86), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory (84) or a RAM (84), a hard disk (83). In a variant, the bitstream is sent to a storage interface (85), e.g. an interface with a mass storage, a flash memory, ROM, an optical disc or a magnetic support and/or transmitted over a communication interface (86), e.g. an interface to a point to point link, a communication bus, a point to multipoint link or a broadcast network.

In accordance with examples of decoding or decoder or renderer 33 of FIG. 3, the bitstream is obtained from a source. Exemplarily, the bitstream is read from a local memory, e.g. a video memory (84), a RAM (84), a ROM (83), a flash memory (83) or a hard disk (83). In a variant, the bitstream is received from a storage interface (85), e.g. an interface with a mass storage, a RAM, a ROM, a flash memory, an optical disc or a magnetic support and/or received from a communication interface (85), e.g. an interface to a point to point link, a bus, a point to multipoint link or a broadcast network.

Figure 10:
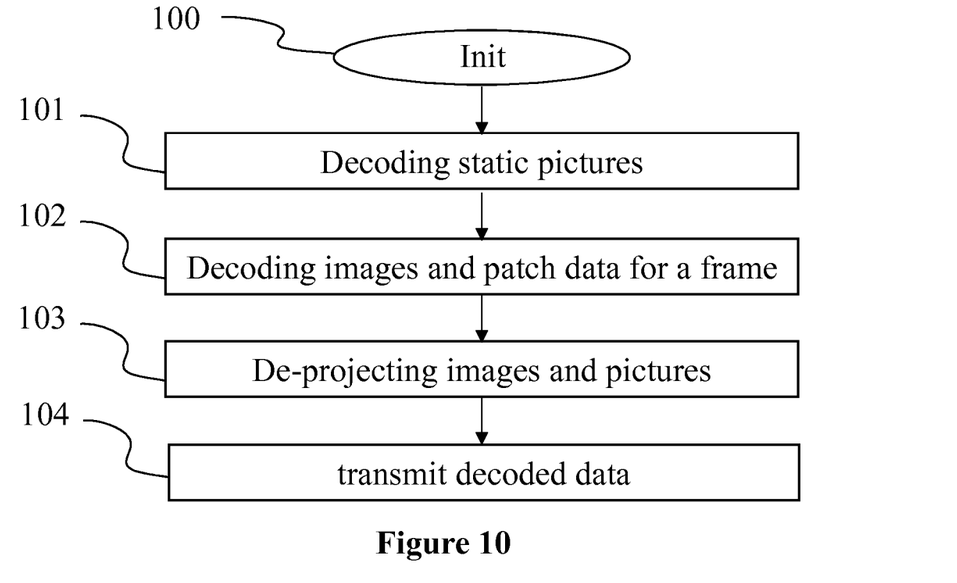
FIG. 10 illustrates a method for decoding a three-dimensional scene from a stream, in a device of FIG. 8 configured to be a device 33 of FIG. 3, according to a non-restrictive embodiment of the present principles.

In accordance with examples, the device 80 is configured to implement a method described in relation with FIG. 9 or 10, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

FIG. 9 illustrates a method for encoding a point cloud in a stream, in a device 80 (described with regard to FIG. 8) configured to be an encoder, according to a non-restrictive embodiment of the present principles.

In a step 90, the different parameters of the device 80 are updated. In particular, the sequence of 3D scenes is obtained from a source, a set of possible points of view is determined in the space of the 3D scene, and, sizes and resolutions of the projection maps, pictures and images are determined.

In a step 91, a projection process is performed on the sequence of 3D scenes in order to obtain a crossed structure of sets of patches and sequence of patches as described in relation to FIG. 5. A patch is a data structure gathering de-projection data, a color picture and a depth picture. A set of patches is representative of the part of the scene visible from every point of view of the set of possible points of view. Any suitable method may be used to obtain these sets of color and depth pictures. De-projection data are data needed to perform the de-projection of the color and depth pictures. They are computed from the projection process parameters and stored in the patch data structure.

In a step 92, a process is performed on this crossed structure of data to determine static and non-static color and depth pictures. Patches of a sequence of patches are compared to determine whether the color or depth picture of the patch is static or non-static. A picture is set static if the picture is repeated at least two times in the sequence as described in relation to FIG. 5.

In a step 93, for each set of patches, a packing process is performed for every non-static color picture of the set of patches to generate a color image and a packing process is performed for every non-static depth picture of the set of patches to generate a depth image. Any suitable method to efficiently pack the pictures in an image may be used at this step. The color image is also called color patch atlas. Color pictures are arranged in the color image with a given angular resolution (e.g. 3 seconds per pixel or 5 seconds per pixel) according to the size that the projection of points of the color picture will occupy in the color patch atlas. The location of a color picture in the color image is stored in a data structure called color data. If the shape of color pictures is not set by default (e.g. a rectangle), the shape used for this color picture in the color image is stored in the color data structure. If the resolution of the color pictures packed in the color image is not constant (i.e. not the same for every color picture), the size of the color picture in the color image is stored in the color data. The same process is applied to depth pictures.

In a step 94, the data stream comprising a video track and an image track is generated according to the structure described in relation with FIG. 7. Static pictures are inserted in the image track of the data stream at a position in the data stream. A position is a location in the data stream indicating at which moment the concerned element will be read by the decoder. The prior the position, the sooner the element is decoded when the stream is read. A static picture is inserted at a position prior to the position of the first patch data item pointing to it. Generated color images, depth images and associated patch data items are encoded in the video track with related temporal information.

FIG. 10 illustrates a method for decoding a three-dimensional scene from a stream, in a device 80 (described with regard to FIG. 8) configured to be a device 33 of FIG. 3, according to a non-restrictive embodiment of the present principles.

In a step 100, the different parameters of the device 80 are updated. In particular, the stream is obtained from a source, a set of possible points of view is determined in the space of the 3D scene. In a variant, the set of possible points of view is decoded from the stream.

In step 101, static pictures available in the image track of the data stream at this step are read and stored in memory. Static pictures a read only once and kept in memory up to the end of the reading of the data stream. In a variant, a garbage collector process is implemented in order to remove from the memory, the static pictures that are no longer pointed in the upcoming data stream.

In a step 102, a data triplet comprising a color image, a depth image and a set of patch data items is obtained from the video track of the data stream. A patch data item comprises color data to retrieve a color picture, geometry data to retrieve a depth picture and de-projection data representative of parameters used to generate both color and depth pictures and needed to process the de-projection operation. The color data of a patch data item may comprise the location (and optionally the shape and/or the size) of the color picture in the color image in which it is packed. The color data may instead comprise a pointer to a static picture that has been read from the image track of the data stream. The geometry data is built on the same model. The depth picture may be retrieved either from the depth image or in the list of already read static depth pictures.

In a step 103, Pixels of the color picture are de-projection by using the de-projection data at a depth calculated according to the initialized parametric function. A part of the scene is thus decoded.

When step 102 and step 103 has been performed on each patch data item, the entire 3D scene has been decoded. In a step 104, the decoded 3D scene is transmitted to a further module, for example a renderer 35 of FIG. 3.

Naturally, the present disclosure is not limited to the embodiments previously described. In particular, the present disclosure is not limited to methods and devices for encoding/decoding a stream carrying data representative of a three-dimension scene (or a sequence of three-dimension scenes) but also extends to methods of rendering a 3D scene in a 3 degrees of freedom manner or in a volumetric manner (i.e. 3DoF+ or 6DoF) to any devices implementing these methods and notably any devices comprising at least one CPU and/or at least one GPU.

The present disclosure also relates to a method (and a device configured) for displaying images rendered from the data stream comprising the information representative of the three-dimension scene.

The present disclosure also relates to a method (and a device configured) for transmitting and/or receiving the stream encoded according to the present principles.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of decoding two three-dimensional scenes of a sequence of three-dimensional scenes from a data stream comprising a video track and an image track, the method comprising:
    obtaining a picture at a first position in the image track of said data stream, pixels of said picture comprising depth and/or color component;
    obtaining, in the video track of said data stream, a first video frame at a second position in the video track and a second video frame at a third position in the video track, a video frame comprising:
        a color image comprising color pictures packed in said color image;
        a depth image comprising depth pictures packed in said depth image; and
        a set of patch data items, a patch data item comprising: de-projection data;
        a location of a color picture in the color image if the color picture is a non-static picture or a pointer to said picture at the first position if the color picture is a static picture; and
        a location of a depth picture in the depth image if the depth picture is a non-static picture or a pointer to said picture at the first position if the depth picture is a static picture;
    wherein said first position is prior to said second position and to said third position in the stream and wherein a static picture is one where said picture is repeated at least two times in the sequence;
    for a patch data item of said set of patch data items of the first video frame, using de-projection data for de-projecting pixels of the color picture at a depth determined by pixels of the depth picture; and
    for a patch data item of the set of patch data items of the second video frame, using de-projection data for de-projecting pixels of the color picture at a depth determined by pixels of the depth picture.

2. The method of claim 1, wherein said location of a color picture in the color image of the first video frame or the second video frame is associated with a size and/or of a shape of the color picture.

3. The method of claim 1, wherein the picture at the first position is stored in a memory to be pointed by the patch data item of the first video frame or by the patch data item of the second video frame.

4. A method for encoding two three-dimensional scenes in a data stream comprising a video track and an image track, the method comprising:
    obtaining two sets of patches associated with a timestamp, a patch belonging to a sequence of patches, a patch comprising de-projection data, a color picture and a depth picture;
    for a sequence of patches, determining for each color picture and depth picture whether the picture is a static picture or a non-static picture, a picture being static if the picture is repeated at least two times in the sequence;
    for the two sets of patches:
        generating a color image packing non-static color pictures of the set of patches;
        a depth image packing non-static depth pictures of the set of patches; and
        a set of patch data items, a patch data item comprising, for a patch, the de-projection data and:
            if the color picture is non-static, a location of the color picture in the color image; else a pointer to a static picture in the image track of the stream; and
            if the depth picture is non-static, a location of the depth picture in the depth image; else a pointer to a static picture in the image track of the stream;
        encoding said color image, depth image and set of patch data items at a position responsive to the timestamp of the set in the video track of the stream;
    encoding static color and depth pictures in the image track of the stream at a position prior to two positions at which the two sets are encoded in the video track of the stream.

5. The method of claim 4, wherein color data of a patch data item further comprises a description of a size and/or of a shape of the color picture in the color image.

6. The method of claim 4, wherein determining whether a picture is repeated in a sequence of patches is performed by computing a distance between said picture and another picture of the sequence of patches; both pictures being repeated if the distance is lower than a given threshold.

7. A device for decoding two three-dimensional scenes of a sequence of three-dimensional scenes from a data stream comprising a video track and an image track, the device comprising a memory associated with a processor configured to:
- obtain a picture at a first position in the image track of said data stream, pixels of said picture comprising depth and/or color component;
- obtain, in the video track of said data stream, a first video frame at a second position in the video track and a second video frame at a third position in the video track, a video frame comprising:
  - a color image comprising color pictures packed in said colored image;
  - a depth image comprising depth pictures packed in said depth image; and
  - a set of patch data items, a patch data item comprising:
    - de-projection data;
    - a location of a color picture in the color image if the color picture is a non-static picture or a pointer to said picture at the first position if the color picture is a static picture; and
    - a location of a depth picture in the depth image if the depth picture is a non-static picture or a pointer to said picture at the first position if the depth picture is a static picture;
- wherein said first position is prior to said second position and to said third position in the stream and wherein a static picture is one where said picture is repeated at least two times in the sequence;
- for a patch data item of said set of patch data items of the first video frame, use de-projection data for de-projecting pixels of the color picture at a depth determined by pixels of the depth picture; and
- for a patch data item of the set of patch data items of the second video frame, use de-projection data for de-projecting pixels of the color picture at a depth determined by pixels of the depth picture.

8. The device of claim 7, wherein said location of a color picture in the color image of the first video frame or of the second video frame is associated with a size and/or of a shape of the color picture.

9. The device of claim 7, wherein the picture at the first position is stored in a memory to be pointed by the patch data item of the first video frame or by the patch data item of the second video frame.

10. A device for encoding two three-dimensional scenes in a data stream comprising a video track and an image track, the device comprising a memory associated with a processor configured to:
- obtain two sets of patches associated with a timestamp, a patch belonging to a sequence of patches, a patch comprising de-projection data, a color picture and a depth picture;
- for a sequence of patches, determine for each color picture and depth picture whether the picture is a static picture or a non-static picture, a picture being static if the picture is repeated at least two times in the sequence;
- for the two sets of patches:
  - generate a color image packing non-static color pictures of the set of patches;
  - a depth image packing non-static depth pictures of the set of patches; and
  - a set of patch data items, a patch data item comprising, for a patch, the de-projection data and:
    - if the color picture is non-static, a location of the color picture in the color image; else a pointer to a static picture in the image track of the stream; and
    - if the depth picture is non-static, a location of the depth picture in the depth image; else a pointer to a static picture in the image track of the stream;
  - encode said color image, depth image and set of patch data items at a position responsive to the timestamp of the set in the video track of the stream;
- encode static color and depth pictures in the image track of the stream at a position prior to two positions at which the two sets are encoded in the video track of the stream.

11. The device of claim 10, wherein color data of a patch data item further comprises a description of a size and/or of a shape of the color picture in the color image.

12. The device of claim 10, wherein determining whether a picture is repeated in a sequence of patches is performed by computing a distance between said picture and another picture of the sequence of patches; both pictures being repeated if the distance is lower than a given threshold.

* * * * *